Sept. 16, 1958  C. FOURÉ  2,851,859
IMPROVEMENTS IN COMBUSTION CHAMBERS FOR TURBO-JET, TURBO-PROP AND SIMILAR ENGINES
Filed July 13, 1953  2 Sheets-Sheet 1
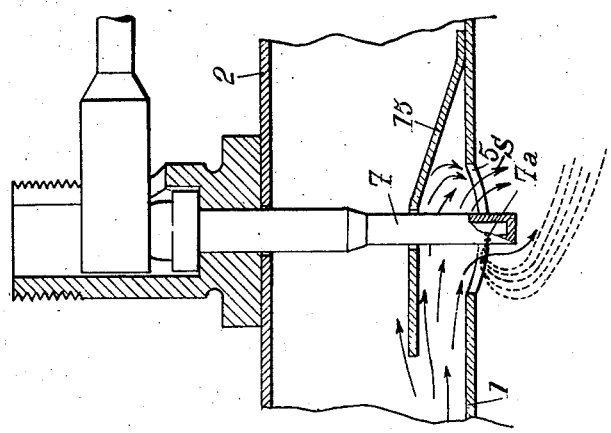
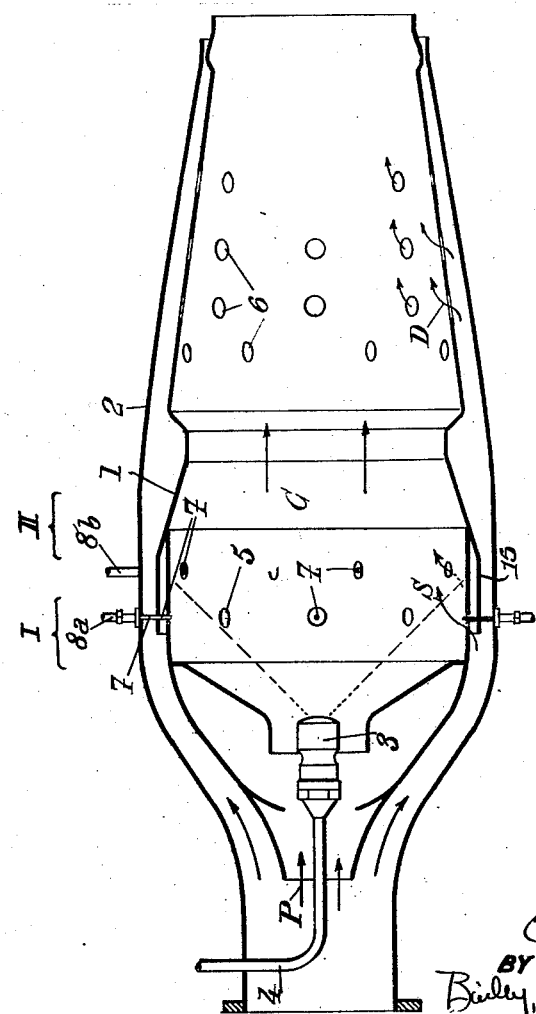
INVENTOR
Claude FOURÉ
BY
Bailey, Stephens & Huettig
ATTORNEYS

United States Patent Office 2,851,859
Patented Sept. 16, 1958

2,851,859

IMPROVEMENTS IN COMBUSTION CHAMBERS FOR TURBO-JET, TURBO-PROP AND SIMILAR ENGINES

Claude Fouré, Courbevoie, France, assignor to Office National d'Etudes et de Recherches Aeronautiques O. N. E. R. A., Chatillon-sous-Bagneux, France, a society of France Application July 13, 1953, Serial No. 367,689

Claims priority, application France July 16, 1952

6 Claims. (Cl. 60—39.65)

The present invention relates to combustion chambers for engines through which a continuous stream of gas is flowing and in particular, but not exclusively, to turbo-jet and turbo-prop combustion chambers, in particular for airplanes.

Its chief object is to provide a combustion chamber of this kind which is better adapted to meet the requirements of practice than those used up to the present time.

It is known, in such machines, to use a combustion chamber the flame tube of which is fed with fuel, near the inlet thereof, by means of a main injector located in the central part thereof, and which is constantly fed with fuel under pressure during the operation of the engine, auxiliary fuel feed means opening into said flame tube being provided downstream of said main injector.

According to my invention, said flame tube, which constitutes a partition dividing the air stream fed to the inlet of said combustion chamber into two elementary air streams, to wit, a main one flowing directly into said flame tube and another one flowing around it, is provided with holes through which at least a portion of said second mentioned elementary air stream enters said flame tube and said auxiliary fuel feed means open into at least some of said holes so as to have their outlets located in the respective constricted portions of the fragmentary air streams flowing through said holes, said auxiliary fuel feed means being supplied with fuel at a pressure which is but a small fraction of the pressure of the fuel fed to said main injector owing to the fact that atomizing of the fuel fed by said auxiliary fuel feed means is chiefly obtained, in carburetor-like fashion, by the velocity of the air stream flowing around said auxiliary feed means. Said auxiliary fuel feed means are brought into play only when the total fuel flow rate to be supplied to the combustion chamber exceeds a given value. On the contrary the main injector is always working when the combustion chamber is in operation.

A preferred embodiment of my invention will be hereinafter described with reference to the accompanying drawings, given merely by way of example, and in which:

Fig. 1 is a diagrammatic view showing, in axial section, one combustion chamber of a turbo-jet engine including a plurality of such combustion chambers disposed in an annular row, said combustion chamber being made according to my invention;

Fig. 2 is a view on enlarged scale of a detail of Fig. 1;

Figure 3:
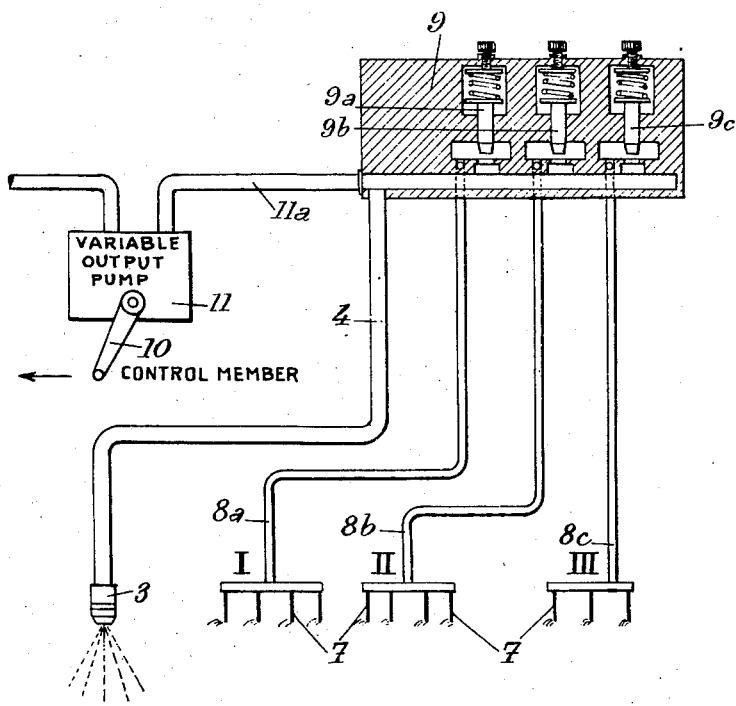

Fig. 3 diagrammatically shows the fuel feed system of the engine.

The engine, a portion of which is shown by the drawing, includes in the usual way at least one compressor which feeds air to one or several combustion chambers intended to feed a gaseous stream to a turbine which drives said compressor. The burnt gases escape through a nozzle so as to form a reaction jet.

It will be supposed, by way of example, that this turbo-jet engine includes a plurality of combustion chambers C distributed to form an annular row about the axis of the engine. Fig. 1 of the drawing shows only one of these combustion chambers, the compressor and the turbine being not illustrated since they do not constitute parts of the structure according to my invention. The flame tube of chamber C is limited by a wall 1, for instance in the form of a surface or revolution, itself surrounded by the wall 2 of the combustion chamber proper. The flow of the gaseous stream takes place in the direction illustrated by the arrows.

The air stream fed by the compressor to the inlet of the combustion chamber is divided by the partition constituted by flame tube 1 into two elementary air streams to wit:

First, a main air stream entering through air intake P directly into flame tube 2 to form a primary air stream flowing in the axial direction of said flame tube, air intake P surrounding a primary injector 3 housed in the upstream portion of said flame tube and constantly fed with fuel from a conduit 4;

On the other hand, another elementary air stream flowing through the annular space between the respective walls of tube 1 and of chamber 2 and at least a portion of which is introduced into flame tube 1 through a plurality of supplementary air intakes constituted by holes formed in the wall of said flame tube downstream of the primary air intake. This supplementary air includes a secondary air feed S which participates at least partly in the fuel combustion, and a dilution air feed D which is introduced downstream of secondary air S.

These supplementary air intakes consist of a multiplicity of holes 5 and 6 formed in the wall of flame tube 1, these holes being grouped in circular rows disposed behind one another in the direction of the axis of the flame tube.

I provide in some of said supplementary air intakes, supplementary fuel injectors 7 which are fed with fuel only when the total fuel feed to be introduced into combustion chamber C exceeds a predetermined value.

Such supplementary injectors 7 are provided in some of the intakes 5 for secondary air S.

It will be understood that, owing to this arrangement, the primary injector 3 will not be required to achieve by itself the total fuel output variations corresponding to the whole range within which the engine working conditions may vary.

Such a reduction of the range of fuel supply required from the primary injector 3 makes it possible to adapt said primary injector especially for low fuel feed rates.

On the other hand, the presence of supplementary injectors at different places along the stream of gas flowing through combustion chamber C will make it possible to comply more exactly at every point with the requirements of a stoichiometric ratio.

It should be noted that supplementary injectors 7 may be distributed in several groups I and II in Fig. 1 and for instance groups I, II and III, in Fig. 3.

In this case, it is advantageous to provide independent conduits 8a, 8b, (Fig. 1) or 8a, 8b, 8c, (Fig. 3) to feed fuel to these respective injector groups. The number of groups brought into action is the higher as the total fuel feed rate that is required is higher. These groups of injectors are successively brought into operation by means of any suitable valve device 9.

Thus, the margin inside which the output must be adjusted for the injectors of every group may be reduced, a new group being brought into play as soon as upper limit of said margin is exceeded. It follows that said injectors may be adapted to this reduced margin and can thus be operative in conditions averaging the optimum efficiency conditions.

On the other hand, it will be of interest to have these respective feed conduits 8a, 8b, 8c (Fig. 3) supplied with fuel through a distributing valve device 9 which automatically achieves (from the value of the total feed rate that corresponds to the starting of supplementary injectors) the operation of a number of supplementary injection stages which is the higher as the total fuel feed rate that is required is itself higher. This total feed rate will then be adjusted by the pilot, for instance by operating the control member 10 of a variable output pump 11 which feeds both the primary injectors of the respective combustion chambers and the groups of supplementary injectors 7 opening into said chambers.

The distributing valve device 9 is merely constituted by three conventional spring-loaded plungers 9a, 9b and 9c controlling the communication between respective conduits 8a, 8b and 8c and the delivery conduit 11a of pump 11. The spring loading of plunger 9b is higher than that of plunger 9a and that of plunger 9c is higher than that of plunger 9b. Conduit 4 is in constant communication with conduit 11a and conduits 8a, 8b and 8c are successively placed in communication therewith as the rate of flow, and delivery pressure, of pump 11 increases.

Of course, the dimensions and locations of the parts are chosen in order to obtain the best possible operation.

By way of example, it may be indicated that the injection pressure advantageously ranges from 5 to 50 kgs. per square centimeter for the primary injector 3 and from 0.5 to 3 kgs. per square centimeter for the supplementary injectors 7. This may be accomplished, as shown by Fig. 1, by making the pipe leading to injector 3 of greater diameter than those leading to injectors 7.

It is advantageous to make use of primary injectors of the whirlwind type as conventionally indicated on the drawing due to the fact that the jet is conical.

I will now describe some further features relating to supplementary injectors 7.

First, every supplementary injector 7 is made and mounted in such manner that its outlet is located in the throttled (or constricted) zone of the fragmentary air stream which flows through the air intake 5 into which said injector opens.

I thus obtain a better atomizing of the fuel because the speed of the supplementary air stream is maximum in the throttled zone which is located, generally and as shown by Fig. 2, in the vicinity of the air intake orifice 5.

It will be easier to collect the supplementary air intake stream by arranging each inlet orifice 5 in the form of a dynamic air intake which can be obtained, in the practical case that is considered, by surrounding the annular groups of orifices 5 by a hood 15 fixed to the flame tube 1 and which opens upwardly.

On the other hand, it is advantageous to give the orifices 7a, through which fuel is ejected a direction such that, at their origin, the fuel jets are substantially perpendicular to the mean direction of the supplementary air stream in the throttled zone.

According to another feature, at least some of the orifices 7a are so located that the jets issuing from said orifices have a speed which has at least one component directed upstream with respect to the gaseous stream flowing through the combustion chamber.

When flame tube 1 and the envelope 2 of the combustion chamber have respective walls which are substantially cylindrical it is advantageous to direct the bodies of injectors 7 radially and to fix them to said envelope whereby efficient cooling of the injector bodies is achieved by the supplementary air stream flowing between envelope 2 and flame tube 1.

It will be understood that injectors 7 which are thus made to work in excellent conditions can be constructed very simply, for instance in the form of mere tubes provided, in their inner ends, with radial orifices 7a (for instance of diameter averaging 0.5 mm.) distributed in the same transverse section of the tube, for instance over half a sector (directed frontwardly).

Owing to their simplicity and their small dimensions the number of the supplementary injectors can be increased without inconvenience and the efficiency of the combustion chamber will be considerably increased.

It should be pointed out that tests were conducted with a conventional turbo-jet combustion chamber slightly modified in order to make it possible to adapt eighteen supplementary injectors housed in secondary air intakes, the orifices of the injectors being of 0.5 mm. The primary injector delivered at most seven grams of fuel per second under pressure of 50 kgs. per square centimeter and the air flow rate was 1 kg. per second.

In these conditions it was found that the combustion efficiency ranges from 0.98 to 1 for values of the air to fuel ratio ranging from 115 to 55 and that it drops to only 0.95 for a value of this ratio equal to 155.

What I claim is:

1. In a continuous gas flow power plant, a combustion chamber which comprises, in combination, means for feeding a stream of air to the inlet of said chamber, partition means in said chamber forming therein at least one flame tube having its inlet downstream of the inlet of said combustion chamber whereby a portion of said air stream flows around said flame tube, a main fuel injector located in the central part of said flame tube near the inlet thereof, said flame tube being provided with a plurality of holes through which fragmentary air streams from said portion of said air stream enter said flame tube, auxiliary fuel injectors located at the periphery of said flame tube and opening into at least some of said holes, said auxiliary fuel injectors having their outlets located in the respective constricted portions of said fragmentary air streams flowing through said last mentioned holes, said outlets being directed transversely to the direction of said fragmentary air streams respectively at the places where said last mentioned air streams flow past said outlets, means for constantly feeding fuel under pressure to said main injector during operation of said engine, and means for temporarily feeding fuel to said auxiliary fuel injectors under a pressure which is but a small fraction of the feed pressure of fuel to said main injector, said auxiliary fuel injectors being located in a portion of said flame tube such that the fuel fed by said auxiliary injectors burns in said flame tube.

2. In a continuous gas flow power plant, a combustion chamber which comprises, in combination, means for feeding a stream of air to the inlet of said chamber, partition means in said chamber forming therein at least one flame tube having its inlet downstream of the inlet of said combustion chamber whereby a portion of said air stream flows around said flame tube, a main fuel injector located in the central part of said flame tube near the inlet thereof, said flame tube being provided with a plurality of holes through which fragmentary air streams from said portion of said air stream enter said flame tube, auxiliary fuel injectors located at the periphery of said flame tube and opening into at least some of said holes, said auxiliary fuel injectors having their outlets located in the respective constricted portions of said fragmentary air streams flowing through said last mentioned holes, said outlets being directed transversely to the direction of said fragmentary air streams respectively at the places where said last mentioned air stream flow past said outlets, said auxiliary injectors being grouped in several rows, means for constantly feeding fuel under pressure to said main injector during operation of said engine, independent means for temporarily feeding fuel to said respective rows of auxiliary injectors under a pressure which is but a small fraction of the feed pressure of fuel to said main injector, the number of groups fed with fuel being the higher as the total feed of fuel is to be higher.

3. An engine according to claim 1 in which said auxiliary injectors are located in an annular row located in a plane transverse to the longitudinal direction of said flame tube, and an annular hood opened in the upstream direction surrounding said annular row on the outside of said flame tube.

4. An engine according to claim 1 in which said auxiliary injector outlets are directed at right angles to the portions of said fragmentary air streams flowing past them.

5. An engine according to claim 1 in which at least some of said auxiliary injector outlets are directed to give fuel jets the velocity of which has at least one component directed upstream of the gaseous flow through the combustion chamber.

6. An engine according to claim 1 in which said auxiliary fuel injectors are carried by the outer wall of said combustion chamber and are disposed radially.

References Cited in the file of this patent
UNITED STATES PATENTS

| | | |
|---|---|---|
| 2,127,172 | Hermitte | Aug. 16, 1938 |
| 2,303,794 | Pateras Pescara | Dec. 1, 1942 |
| 2,493,641 | Putz | Jan. 3, 1950 |
| 2,508,420 | Redding | May 23, 1950 |
| 2,520,967 | Schmitt | Sept. 5, 1950 |
| 2,546,432 | Darling | Mar. 27, 1951 |